Figure 1:
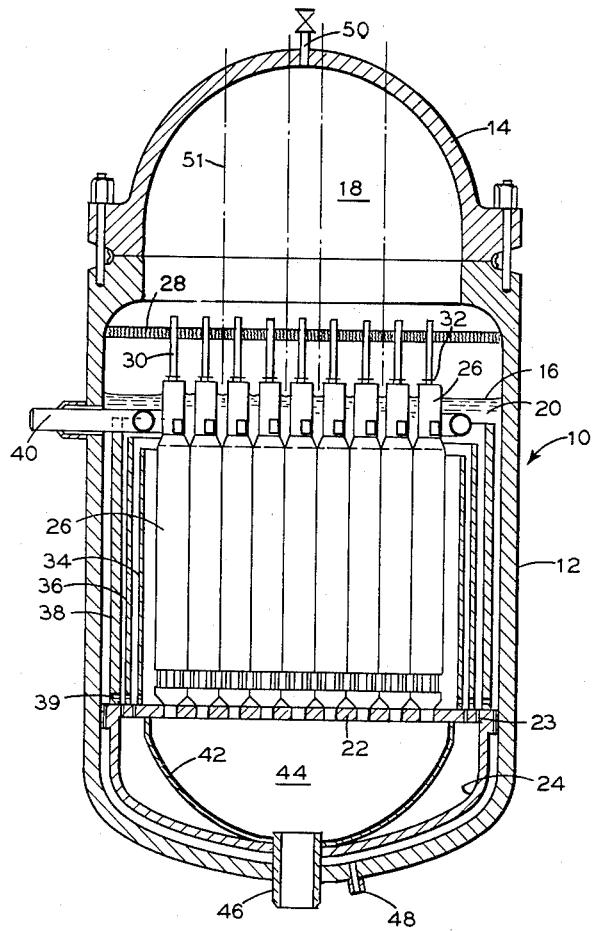

May 25, 1965  J. H. AMMON  3,185,630
BOILING COOLANT REACTOR WITH INTEGRAL VAPOR
SEPARATION AND NUCLEAR SUPERHEAT
Filed Dec. 1, 1960  3 Sheets-Sheet 1

INVENTOR.
Johannes H. Ammon
BY
ATTORNEY

May 25, 1965 J. H. AMMON 3,185,630
BOILING COOLANT REACTOR WITH INTEGRAL VAPOR
SEPARATION AND NUCLEAR SUPERHEAT
Filed Dec. 1, 1960 3 Sheets-Sheet 2
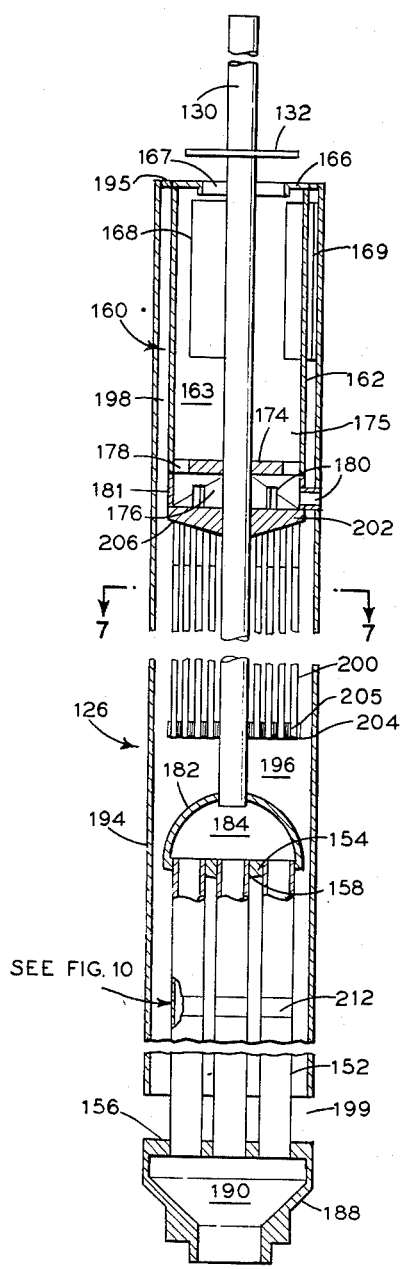
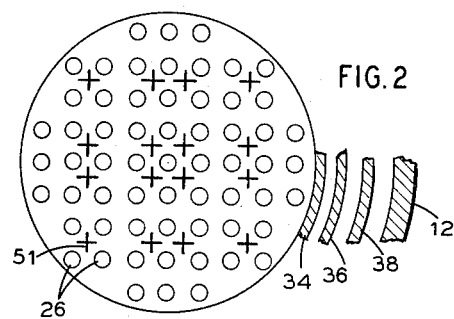
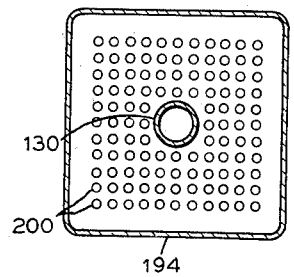
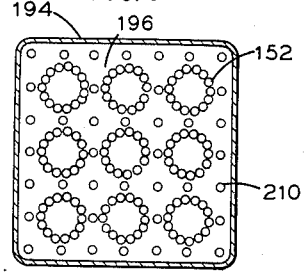
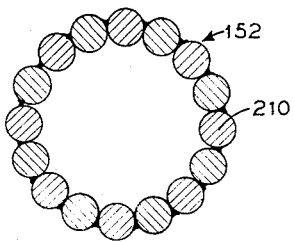
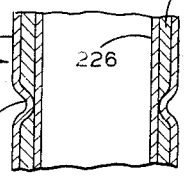
INVENTOR.
Johannes H. Ammon
BY
ATTORNEY INVENTOR.
Johannes H. Ammon
BY
ATTORNEY United States Patent Office 3,185,630
Patented May 25, 1965

3,185,630
BOILING COOLANT REACTOR WITH INTEGRAL VAPOR SEPARATION AND NUCLEAR SUPERHEAT
Johannes H. Ammon, Akron, Ohio, assignor to The Babcock & Wilcox Company, New York, N.Y., a corporation of New Jersey
Filed Dec. 1, 1960, Ser. No. 72,958
9 Claims. (Cl. 176—54)

This invention relates in general to a boiling coolant reactor and, more particularly, to a boiling coolant reactor containing a plurality of fuel element assemblies each of which is capable of boiling the coolant, separating it into its vapor and liquid portions, and then finally superheating the vapor portion before its discharge to a point of use.

Boiling coolant reactors and, particularly, boiling water reactors are well known in the present state of nuclear reactor technology. In most of these reactors the boiling two phase coolant leaves the reactor at the saturation temperature corresponding to the pressure maintained within the reactor. Upon separation of the liquid portion from the vapor portion, the latter is subsequently superheated for use in a modern commercial power plant.

One arrangement currently proposed is to take saturated boiling vapor from the reactor and superheat it in a separate unit, using fossil fuel as the source of heat. This has the obvious disadvantage of requiring two separate pieces of apparatus with each using a different heat source, thus failing to achieve the advantages inherent in using a single heat source in a single vessel to both generate and superheat a vaporizable coolant.

Another proposed arrangement has been to boil the coolant in one part of a reactor core and then superheat it in another part of the same core. This raises some special physics problems due to having two different zones within the core, with each subject to different moderation.

In these reactor arrangements vapor-liquid separation is attained either by natural differential density separation, which is relatively inefficient, or by separating equipment positioned within the reactor vessel but outside of its core region. Although the latter arrangement is a definite improvement over the former, it still involves several problems. When the separating equipment is located above the core additional apparatus is needed to convey the vapor-liquid to it and to return the separated fractions back to the core. If, on the other hand, the separating equipment is located laterally about the core, not only is the additional apparatus needed to convey the vapor-liquid components, but the diameter of the vessel also must be increased or the diameter of the core proportionately decreased to make room for the separating equipment within the reactor vessel.

The problem of reactor vessel size is an important consideration in achieving economic nuclear power. The diameter of a reactor vessel is generally limited by design and operating pressures, fabrication techniques and manufacturing facilities, and by the maximum permissable size of vessel that can be transported over available routes to the plant site. In view of these considerations it is desirable to provide a reactor in which both boiling and superheating can be efficiently and economically carried out, advantageously incorporating the maximum core size and diameter compatible with the overall dimensions of the reactor vessel. This invention recognizing these advantages, provides a core built up of a number of fuel element assemblies, in each of which the coolant is successively boiled, the vapor and liquid separated and the vapor superheated. Maximum core size is attained without the space limitations of a two zone core, i.e. one zone to boil, the other to superheat the coolant, or without the additional apparatus necessary to convey the vapor-liquid mixture from the core to the separating equipment and then return the separated vapor back to the core.

Accordingly, the present invention provides a boiling coolant nuclear reactor which is also adapted to both separate and superheat the vaporized coolant. In operation the reactor vessel has a liquid collecting space and a vapor collecting space with a coolant liquid level separating or distinguishing the two spaces. A plurality of fuel element assemblies comprising bodies of material fissionable by neutrons of thermal energy are positioned within the reactor vessel. These fuel element assemblies are disposed, for most of their length, below the liquid level. Each fuel element assembly is capable of first boiling the vaporizable coolant flowing through the reactor, second, separating the coolant into its vapor and liquid portions and, third, superheating the vapor portion as it recirculates through the fuel element assembly.

Additionally, the present invention contemplates a specific fuel element assembly arrangement for use in a boiling coolant nuclear reactor in which the coolant is first boiled, and the vapor then separated for superheating as it flows through the assembly. The fuel element assembly comprises a plurality of elongated tubular fuel elements positioned below and in axial alignment with its corresponding vapor-liquid separator. Both the fuel elements and the vapor-liquid separator are laterally enclosed by wall means to form a riser chamber in which the vaporizable coolant flows over the tubular fuel elements. These same wall means in conjunction with the separator, also form an annular passageway to convey the vapor-liquid coolant from the riser chamber to the separator. Means are provided for passing the separated vapor coolant through the inside of the tubular fuel elements where it is superheated.

Another embodiment of this fuel element assembly, similar to the one just described, provides a bundle of pin-type fuel components arranged between and in axial alignment with the tubular fuel elements and the vapor-liquid separator. In this arrangement the vaporizable coolant passes through the riser chamber wherein it is heated to its boiling temperature as it passes over the outside of the tubular fuel elements and the pin-type fuel components. From the riser chamber it passes into the separator where it is separated into its vapor and liquid portions. Means are provided to then pass the vapor through the inside of the tubular fuel components where it is superheated.

In addition, this invention provides a tubular fuel component which is clad for a first portion of its surface with one cladding material, the remaining second portion being clad with a metal having better heat resisting characterisitcs to the end that the vapor can be superheated in this latter portion to the desired temperature without encountering the temperature limitations imposed by the characteristics of the metal forming the cladding about the first portion of the tubular fuel element.

Furthermore, this invention discloses a tubular fuel element which is built up of a plurality of longitudinally extending, pin-type fuel components circumferentially arranged in tangential wall to wall relationship to form an imperforate tubular fuel element.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of the invention.

Figure 3:
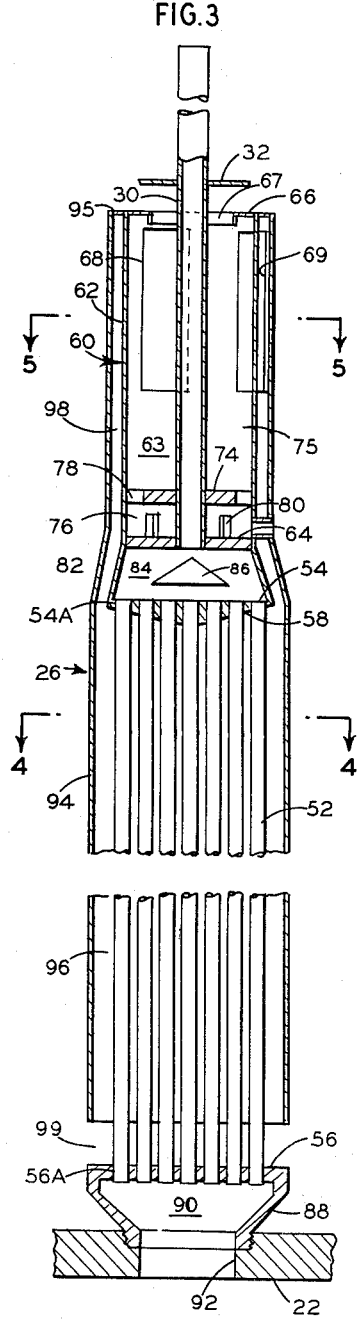
Figure 5:
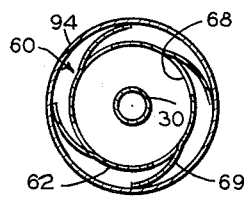
Figure 4:
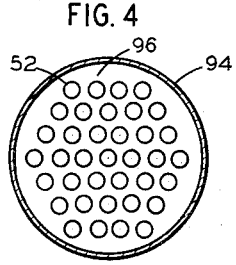
Figure 10:
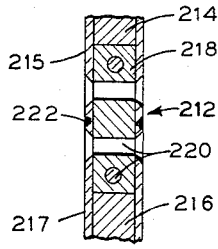

Of the drawings:

FIG. 1 is a vertical cross-sectional view of a reactor vessel embodying the present invention, FIG. 2 is a somewhat schematic plan view of an arrangement of the control rods and fuel element assemblies of the reactor in FIG. 1, FIG. 3 is an enlarged partial vertical cross-sectional view of a fuel element assembly illustrated in FIG. 1, FIG. 4 is a cross-sectional view taken along line 4—4 of FIG. 3, FIG. 5 is a cross-sectional view taken along line 5—5 of FIG. 3, FIG. 6 is a partial vertical cross-sectional view of another embodiment of the fuel element assembly, FIG. 7 is a cross-sectional view taken along line 7—7 in FIG. 6, FIG. 8 is a horizontal cross-sectional view of another embodiment of a bundle of tubular fuel elements, FIG. 9 is an enlarged horizontal cross-sectional view of one of the tubular fuel elements illustrated in FIG. 8, FIG. 10 is an enlarged view of that portion of the tubular fuel element shown circled in FIG. 6, and FIG. 11 is a vertical cross-sectional view of another embodiment of a tubular fuel element similar to that shown in FIGS. 3 and 6.

In FIG. 1 there is shown a boiling coolant reactor 10 embodying the present invention. The reactor 10 comprises a reactor pressure vessel 12 with a bolted closure member 14. The interior of the reactor is divided into an upper vapor space 18 and a lower liquid space 20 defined by the positioning of the coolant liquid level 16. A horizontally arranged support plate 22 extends across the lower part of the reactor liquid space and has a number of orifices 23 spaced adjacent to its periphery. Throughout its periphery it is connected to a lower thermal shield 24 which is spaced adjacent the lower or base portion of the reactor vessel 12.

Within the vessel a number of fuel element assemblies 26 of material fissionable by neutrons of thermal energy are fitted into the support plate 22 and extend upwardly through the liquid space 20 and on into the vapor space 18, terminating a short distance above the normal coolant liquid level 16. Each of said fuel element assemblies 26 includes a conduit 30 in communication with the vapor space 18 which extending downwardly, passes through a horizontally positioned scrubber 28 and is secured within the fuel element assembly. A deflector plate 32, disposed about each of the conduits 30, is located in the space between the scrubber 28 and the top of the fuel element assemblies 26. The scrubber 28 is placed above the normal water level 16 and extends across the total cross sectional flow area of the reactor 10.

The fuel element assemblies 26 are enclosed by three concentrically arranged cylindrically shaped thermal shields 34, 36 and 38 which extend upwardly from the support plate 22 the requisite distances above the fuel element assemblies to provide the necessary shielding effect. A number of circumferentially spaced horizontally extending orifices 39 are located near the lower ends of the thermal shields 34, 36 and 38. A ring shaped coolant inlet header 40 within the liquid space 20 encircles the fuel element assemblies.

In the lower part of the liquid space 20 a generally hemispherical, suitably insulated plate 42, attached about its peripheral edge to the support plate 22, forms a superheated vapor collection chamber 44. A superheated vapor outlet nozzle 46 extends from the collection chamber 44 through the lower thermal shield 24 and the base of the reactor 12 to the exterior of the vessel. There is also a drain connection 48 located in the lower head of the reactor vessel 12 for draining the space between the lower portion of the reactor vessel and the thermal shield 24. A valved vent connection 50 opening into the vapor space 18 is located in the closure member 14.

In FIG. 1 the location of control rods 51 is generally indicated by center-lines, while FIG. 2 shows a typical arrangement of the control rods within the core of the reactor 10. It will be understood by those skilled in the art that the relative positioning and contour of the control rods may be varied to suit the arrangement and shape of the fuel element assemblies within the reactor 10.

In the embodiment of the fuel element assembly 26 shown in FIG. 3 the fuel is contained within a plurality of vertically extending tubular fuel elements 52 disposed in spaced parallel relationship and extending between an upper tube sheet 54 and a lower tube sheet 56. The tubular fuel elements 52 are arranged in a triangular lattice and form a bundle of circular cross-section with the ends of the fuel elements fitted into tube seats 54A, 56A in the upper and lower tube sheets 54, 56 respectively. The lower face 58 of the upper tube sheet 54 is inclined upwardly from its centerpoint to direct the coolant flow outwardly toward its periphery.

A vapor-liquid cyclone type separator 60 is positioned above and in axial alignment with the bundle of tubular fuel elements 52. Vertically extending walls 62 form a cylindrically shaped hollow whirl chamber 63 closed at its lower end by plate 64 and having an annular shaped plate 66 disposed across its upper end to form a centrally positioned vapor outlet 67. A number of inlet openings 68, circumferentially spaced in the wall 62, admit a vapor-liquid mixture into the whirl chamber 63. Each of the inlet openings 68 has a corresponding vertically extending vane 69 connected along one of its vertical edges to one side of the inlet opening, with its other vertical edge spaced outwardly from the wall 62. The vanes 69 are curved in a vertical plane so that the concave side of each vane faces inwardly toward its corresponding inlet opening 68. These vanes are arranged to provide substantially tangential entry of the vapor-liquid mixture into the whirl chamber 63.

The whirl chamber 63 is divided by a horizontally arranged partition 74 into an upper whirl space 75 and a lower liquid outlet space 76. Openings 78 circumferentially spaced in partition 74 permit flow of separated liquid from the whirl space 75 to the liquid space 76. Circumferentially spaced liquid outlet passageways 80 extend outwardly from the wall 62 to permit discharge of liquid from the liquid space 76 to the liquid space 20.

The conduit 30 passes centrally through the separator 60 with its lower or outlet end fitting into and extending through the plate 64 and its upper or inlet end located above the top of the separator. A horizontally arranged ring shaped vapor deflector plate 32 encircles the conduit 30 directly above the vapor outlet 67.

Vertically arranged, frusto-conically shaped wall section 82 is connected around its top edge to the base of the separator 60 and about its bottom edge to the upper tube sheet 54 and forms in combination therewith a vapor inlet chamber 84. The vapor conduit 30 opens into this chamber 84 and the tubular fuel elements 52, which extend through the upper tube sheet 54, also open into this chamber. In the chamber 84 a conically shaped deflector baffle 86 is positioned with its apex directed upwardly and in axial alignment with the conduit 30.

At the lower end of the fuel element assembly a frusto-conically shaped wall 88 is connected to the lower tube sheet 56 and extends downwardly to form, in combination with the tube sheet, a vapor outlet chamber 90. The lower end of the wall 88 is threaded about its outer face for connection into the threaded portion of support plate 22. The lower ends of the tubular fuel elements 52 discharge into the vapor outlet chamber 90 which in turn communicates with the vapor collection chamber 44 through opening 92 in the support plate 22.

As shown in FIG. 3 a vertically disposed, cylindrically shaped wall 94 extends from a horizontal plane spaced a short distance above the lower tube sheet 54 upwardly to the top of the separator 60. At its upper edge, the wall 94 is connected to the separator 60 by means of a ring shaped plate section 95. This wall 94 is spaced from the tubular fuel elements 52 and also from the separator wall 62 to form a riser chamber 96 about the tubular fuel elements 52 and a cooperating annular shaped passageway 98 about the separator. This passageway is closed at the top by the plate section 95. The space between the lower end of the wall 94 and the lower tube sheet 56 forms a coolant inlet opening 99 to the riser chamber 96.

In FIG. 6 there is shown another embodiment of the fuel element assembly of the present invention. Corresponding component parts of the fuel element assembly 126 shown in FIG. 6 which are similar to those shown in FIG. 3 are identified with the same numeral used in FIG. 3 with the addition of the prefix 1.

In this arrangement the fissionable material is contained within a bundle of tubular fuel elements 152 and a bundle of pin-type fuel components 200. The fuel components 200 are positioned between and in axial alignment with the tubular fuel elements 152 and a liquid-vapor separator 160.

Tubular fuel elements 152 are disposed in spaced, parallel relationship in a square lattice as in FIG. 8 and extend vertically between a vapor inlet chamber 184 and a vapor outlet chamber 190. The inlet chamber is formed by upper-tube sheet 154 and hemispherical shaped plate section 182 while the outlet chamber is formed by lower tube sheet 156 and the cooperating plate section 188, with the tubular fuel elements 152 fitted into the upper and lower tube sheets.

The pin-type fuel components 200 are also arranged in a square lattice as in FIG. 7. They are arranged in spaced, parallel relationship and extend vertically between, and are fitted into, upper and lower end plates or tube sheets 202, 204 respectively. The lower face 158 of the upper tube sheet 154 and the lower face 206 of the upper end plate 202 are both inclined upwardly from their midpoints to direct coolant flow outwardly to their periphery. A plurality of openings 205 in the lower end plate 204 permits coolant to flow through it.

The liquid-vapor separator 160 is of the same basic construction as the separator 60 in FIG. 3. Cylindrically shaped vertically extending wall 162 forms a cylindrically shaped hollow whirl chamber 163, with the upper end plate 202 of the bundle of pin-type fuel components 200 forming the bottom closure member for the chamber. At its top the whirl chamber 163 is closed by an annular shaped plate 166 with a vapor outlet opening 167. Vanes 169 extending outwardly from the wall 162 are positioned opposite corresponding inlet openings 168 into the whirl chamber of the separator 160.

The whirl chamber 163 is divided into an upper whirl space 175 and a lower liquid outlet space 176 by a horizontally ararnged partition 174. About its outer periphery the plate 174 has a plurality of openings 178 to permit passage of fluid from the whirl space 175 into the liquid space 176 from whence it passes through liquid outlet passageway 180 which extends to the exterior of the fuel element assembly. Since the separator 160 is cylindrically shaped and the upper end plate 202 is rectangular the lower end of the wall 162, which forms the wall of the liquid outlet chamber 176, provides a transition section 181 between the two elements.

Vapor conduit 130 which opens at its lower end into the vapor inlet chamber 184 extends axially upward through the bundle of pin-type fuel components 200 and the separator 160 to a point above the top of the separator. An annular shaped deflector plate 132 is positioned about the inlet conduit 130 directly over the vapor outlet opening 167.

Walls 194 forming a square chamber extend upwardly from a horizontal plane closely spaced above the lower tube sheet 156 to the top of the separator 160 where they are connected to the separator wall 162 by means of an imperforate suitably shaped plate section 195. The walls 194 are spaced from and enclose both of the bundles of fuel containing members 152, 200 and the separator 160 to form a riser chamber 196 about the fuel bundles and a passageway 198 connecting the riser chamber at its upper periphery with the separator. This passageway 198 is of varying width because its inner boundary is circular while its outer boundary is square.

Entrance to the riser chamber is provided by the opening 199 between the lower end of the wall 194 and the lower tube sheet 156.

In FIG. 8 there is shown an assembly of tubular fuel elements made up of an array of fuel pins which could be used for the elements 152 of FIG. 6. In addition to the tubular fuel elements 152 pin-type components 210 may also extend between the tube sheets to provide supplemental heating surface.

In FIG. 9 there is shown an enlarged view of a tubular fuel element 152 in FIG. 8. This tubular fuel component is composed of a number of pin-type fuel components 210, arranged in a circle and in tangential wall to wall contact. The individual pin-type fuel components are welded together to form a circular unitary member having an imperforate wall structure. While this particular embodiment is shown as being built up out of pin-type fuel components, it will be apparent that a typical tubular fuel section, clad inside and out, could also be used for this type of fuel element.

The tubular fuel elements 152 in FIG. 6 have a transition section 212 which is shown in detail in FIG. 10. It is the purpose of the transition section 212 to join together two adjacent, axially aligned portions of the tubular fuel elements 152, each of which has a different cladding material. Specifically, the reason for this transition section is to combine the use of two different types of cladding, for instance zirconium and stainless steel, on portions of the same tubular fuel element. Constructions of this nature are used because zirconium is not structurally stable above 600° F. and it, therefore, cannot be used in contact with a fluid which is being heated above that temperature. In FIG. 10 the upper portion 214 of the pin-type fuel component which forms the tubular element has a cladding 215 of zirconium and the lower portion 216 a cladding 217 of stainless steel. The interior diameter of both claddings is substantially the same. A zirconium pin 218 is fitted into extensions of the claddings of the upper and lower portions. Zirconium rivets 220 extends transversely through the claddings and the zirconium connecting pin 218 to join the respective claddings and the pin and thereby form an integral juncture. The zirconium cladding and the stainless steel claddings are welded together to form a tight joint 222 about the zirconium connecting pin. This provides a pin-type component with the characteristic low thermal neutron absorption of zirconium for a portion of its length and with the high heat resistance of stainless steel for the remainder of its length. It should be noted that the cladding materials are not intended to be limited to zirconium and stainless steel and any other suitable cladding material can be used where their differing characteristics may be desired.

Further, it will be apparent to those skilled in the art that if a typical tubular fuel section is used rather than a built-up pin-type of FIG. 9, the interior could be clad exclusively with stainless steel and the exterior with zirconium. In addition, a connecting ring could be used to join an upper portion clad inside and out with one cladding material to a lower portion clad similarly, but with a different cladding material.

If a tubular fuel element having a different cladding inside and out is used, the arrangement shown in FIG. 11 can be employed to avoid the problems resulting from differential expansion. In the tubular feed element 223 tubular fuel section 224 has an inside cladding 226 of one material and an outside cladding 228 of another type of material. An expansion joint 230 is provided in the outside cladding 228 which permits differential expansion of that cladding with respect to the inside cladding.

While this arrangement has been disclosed using dissimilar claddings, it can also be used where the same cladding material is used for both the inside and outside surfaces of the fuel section. In any event, if there is a substantial temperature difference in the two claddings, they will expand at different rates and provision must be made for this expansion differential.

The following is a description of the manner in which reactor 10 operates and includes for purposes of the description the embodiment of the fuel element assembly 26 illustrated in FIG. 3. The control rods 51, see FIGS. 1 and 2, are positioned within the core to provide a controlled chain type fission reaction.

The coolant flows downwardly through the liquid space passing over the exterior of the fuel element assemblies 26 as well as flowing in the annular spaces between the thermal shields 34, 36, 38. Orifices 39 to control the rate of flow in the annuli are located near the bottom of the thermal shields. In addition orifices 23 in the support plate 22 provide for admission of a regulated amount of the coolant both to the space between the lower head of the reactor vessel 12 and the bottom thermal shield 24 and also to the space between the thermal shield 24 and the insulated plate 42 to provide both a reflector for thermal neutrons and a thermal barrier between the vapor outlet chamber 44 and the walls of the pressure vessel 12. To insure proper channeling of the flow, the fuel element assemblies 26 are attached to the support plate 22 to prevent leakage of the coolant into the vapor outlet chamber 44. Thus after its passage downward through the liquid space 20 the coolant passes through the inlet opening 99 and into the riser chamber 96, see FIG. 3.

Within the riser chamber the coolant passes upwardly flowing over the outside of the tubular fuel elements 52. The lower face 58 of the upper tube sheet 54 is inclined upwardly from its center-point to direct the flow of coolant from the riser chamber 96 to the annular passageway 98, its sloping shaped also preventing the formation of vapor pockets on the lower face 58 of the upper tube sheet 54.

In its passage through the riser chamber 96 the coolant is heated until it boils, with the vapor-liquid mixture flowing upward through the annular passageway 98 where it is directed by vanes 69 through inlet opening 68 into the separator 60. The vanes 69 extend outwardly across the passageway 98 to the walls 94 and cause the coolant to enter the separator 60 substantially tangential to the wall 62, producing a cyclonic effect to promote separation of the vapor from the liquid. The separated vapor portion passes upwardly through the vapor outlet 67 and into the vapor space 18. As the vapor portion exits from the separator it is directed against the deflector plate 32 which provides an additional vapor-liquid separation effect.

The liquid portion of the coolant flows downwardly within the whirl space 75, through the openings 78 in the partition 74 and into the liquid space 76, from whence it flows through the outlet passageways 80 and back into the liquid space 20 where it mixes with the make-up coolant from the header 40 prior to its return to inlet 99 for passage through the fuel element assembly. The make-up coolant is supplied to compensate for the coolant liquid which has been converted into vapor, thus maintaining a substantially constant volume of coolant liquid in the vessel.

After discharge from the separator the vapor portion continues its upward flow within the vapor space 18, passing through the vapor scrubber 28 where the residual entrained liquid is separated out. While the reactor is shown with a scrubber, it is not a necessary element since separation within the reactor may be satisfactorily accomplished using the separators only. Closely spaced above the top of the scrubber 28 is the inlet to the conduit 30 which serves to carry the vapor downwardly into the vapor inlet chamber 84, for distribution into the tubular elements. In flowing therethrough the saturated vapor is superheated.

Depending on the degree of the superheat desired, the internal flow path of the tubular fuel elements may be clad with zirconium or some similar low thermal neutron absorbing material. If it is desired to superheat the vapor portion of the coolant above 600° F., then it is possible to use fuel elements, the first or upper portion of which is clad with zirconium, with the lower portion stainless steel clad. The extent of the two different cladding materials is proportioned so that as the vapor flows through the upper portion, it will be heated to approximately 600° F. and then it is further superheated to the desired final temperature as it passes through the stainless steel clad lower portion.

After its passage through the tubular elements, the superheated coolant flows into the outlet chamber 90 in the base of the fuel element assembly 26. The superheated vapor coolant from the chamber 90 of each fuel element assembly then flows into the superheated vapor collection chamber 44 from whence it is discharged to a point of use. The insulated plate 42 minimizes the cooling effect of the liquid coolant on the superheated vapor within the space between the plate 42 and the lower thermal shield 24.

If the embodiment of the fuel element assembly 126 shown in FIG. 6 is used the coolant is heated to its saturation temperature in passing first over the outside of the tubular fuel elements 152 and then over the pin-type fuel components 200. The coolant is admitted to the bundle of pin-type fuel components by flowing through openings 205 in the lower end plate 204 and also by flowing through the space between the plate 204 and the wall 194. The remainder of the coolant flow path through fuel element assembly 126 is substantially the same as through assembly 26 except that the separated vapor passing through the conduit 130 receives additional heat as it passes through the bundle of pin-type fuel components 200, prior to its entering the fuel elements 152.

Differential expansion within the reactor vessel 10 is minimized by supporting each fuel element assembly 26 by plate 22. Thus the upper tube sheet 54, the separator 60 and the fuel component wall 94, as well as the other parts of a fuel element assembly are free to expand in accordance with thermal gradients. When the fuel element assembly is in actual operation and generating heat, these parts will be expanding upward in relation to the support plate 22.

This arrangement combines vapor generation, vapor separation and vapor superheating all within the integral fuel element assemblies. These assemblies are individually removable so that should one fail it can be removed without requiring a complete core replacement.

While light water would be the preferred coolant in our present state of reactor technology, it will be readily understood that other coolants such as heavy water, or other inorganic or organic fluids could also be used. Further, the reactor can be adapted for use either with natural circulation or with forced circulation of the coolant.

Another advantage of the bi-metal clad fuel element assemblies in this invention is that they can be sized and proportioned to provide the desired superheated coolant temperature. Further the number, and arrangement size of the fuel element assemblies can be selected to provide a reactor the physical size of which is limited only by manufacturing and shipping facilities.

While in accordance with the provisions of the statutes I have illustrated and described herein the best form of the invention now known to me, those skilled in the art will understand that changes may be made in the form of apparatus disclosed without departing from the spirit of the invention covered by my claims, and that certain features of my invention may be sometimes used to advantage without a corresponding use of other features.

What is claimed is:

1. A fuel element assembly for use in a boiling coolant nuclear reactor arranged to superheat vapor generated therein comprising a first bundle of spaced elongated tubular fuel elements, a second bundle of spaced elongated pin-type fuel components in axial alignment with but spaced from said first bundle of fuel elements, wall means disposed laterally about and spaced from said first and second bundles to form a vapor generation chamber containing said bundles, a vapor-liquid separator disposed within said vapor generation chamber in axial alignment with and spaced from said first bundle by said second bundle, and a conduit having its inlet located above said vapor-liquid separator and extending downwardly to said first bundle of tubular fuel elements for flowing vapor through said tubular fuel elements.

2. A fuel element assembly for use in a boiling coolant nuclear reactor arranged to superheat vapor generated therein comprising a plurality of spaced elongated vertically arranged fuel components at least a number of which are tubular fuel components, a vapor-liquid separator superjacent to and axially aligned with said tubular fuel components, vertically extending wall means disposed about and spaced from said fuel components and vapor-liquid separator to form a vapor generation chamber about said fuel components and in combination with said separator to form a passageway connecting said chamber to said separator, and a downwardly extending conduit having its inlet located above said separator and its outlet in communication with the inside of said tubular fuel components.

3. A fuel element assembly for use in a boiling coolant nuclear reactor arranged to superheat vapor generated therein comprising a bundle of spaced elongated vertically extending tubular fuel elements, a vapor-liquid separator superjacent to and axially aligned with said bundle, wall means disposed laterally about and spaced from said tubular fuel elements and vapor-liquid separator to form a riser chamber about said fuel elements and in combination with said separator a passageway connecting said chamber to said separator, and a downwardly extending conduit having its inlet located above said separator and its outlet in communication with the inside of said tubular fuel elements.

4. A fuel element assembly for use in a boiling coolant nuclear reactor adapted to superheat vapor generated therein comprising a lower tube sheet, an upper tube sheet spaced above and in axial alignment with said lower tube sheet, plate means in combination with said lower tube sheet forming an outlet chamber, plate means in combination with said upper tube sheet forming an inlet chamber, a bundle of spaced vertically elongated tubular fuel elements fitted into and extending between said tube sheets and communicating between said inlet and outlet chambers, a vapor-liquid separator superjacent to and axially aligned with said bundle, vertically extending wall means disposed about and spaced from said tubular fuel elements and vapor-liquid separator to form a riser chamber about said fuel elements and in combination with said separator a passageway connecting said riser chamber and said separator, and a downwardly extending conduit having its inlet located above said separator and its outlet in communication with the inside of said tubular fuel elements.

5. A vertically elongated fuel element assembly for use in a boiling coolant nuclear reactor adapted to superheat vapor generated therein comprising a lower tube sheet, an upper tube sheet spaced above and in axial alignment with said lower tube sheet, plate means in combination with said lower tube sheet forming an outlet chamber, plate means in combination with said upper tube sheet forming an inlet chamber, a bundle of spaced vertically elongated tubular fuel elements fitted into and extending between said tube sheets and communicating between said inlet and outlet chambers, a vapor-liquid separator axially aligned with and superjacent to said bundle, a separated vapor outlet centrally located in the top of said separator, vertically extending wall means disposed about and spaced from said tubular fuel elements and vapor-liquid separator to form a riser chamber about said fuel elements and in combination with said separator a passageway for connecting said riser chamber to said separator, a vertically extending conduit having its inlet located above said separator and extending axially downward through said separator and having its outlet opening to said inlet chamber for flowing vapor through the inside of said tubular fuel elements and a deflector plate located closely above and opposite said separated vapor outlet.

6. A vertically elongated fuel element assembly for use in a boiling coolant nuclear reactor adapted to superheat vapor generated therein comprising a lower tube sheet, an upper tube sheet spaced above and in axial alignment with said lower tube sheet, plate means in combination with said lower tube sheet forming an outlet chamber, plate means in combination with said upper tube sheet forming an inlet chamber, a bundle of spaced vertically elongated tubular fuel elements fitted into and extending between said tube sheets and communicating between said inlet and outlet chambers, a cylindrically shaped vertically disposed cyclone type vapor-liquid separator axially aligned with and superjacent to said bundle, a separated vapor outlet centrally located in the top of said separator, a horizontally arranged partition positioned within and spaced above the bottom of said separator to divide it into an upper separator space and a lower liquid space, said partition having openings therein to provide passage of separated liquid from said separator space to said outlet space, vertically extending wall means disposed about and space from said tubular fuel elements and vapor-liquid separator to form a riser chamber about said fuel elements and in combination with said separator a passageway for flowing the vapor-liquid mixture from said riser chamber to said separator, a ring shaped plate section connected to the top of said separator and to said wall means to provide a closure for the top of said passageway, said separator having openings therein communicating with said passageway, a number of vertically extending vanes located in said passageway opposite the openings in said separator, said vanes having one vertically extending edge thereof connected to said separator, a liquid outlet conduit connected at its inlet end to the liquid space in said separator and passing through said passageway and having its outlet end discharging exteriorly of said wall means, and a downwardly extending conduit having its inlet located above said separator and its outlet opening to said inlet chamber for flowing vapor through the inside of said tubular fuel elements.

7. A fuel element assembly for use in a boiling coolant nuclear reactor adapted to superheat vapor generated therein comprising a first bundle of spaced elongated vertically extending tubular fule elements, a second bundle of spaced elongated vertically extending pin-type fuel components superjacent to and in axial alignment with said first bundle of fuel elements, a vapor-liquid separator superjacent to and axially aligned with said bundles, wall means disposed laterally about and spaced from said first and second bundles and separator to form a vapor generation riser chamber about said bundles and in combination with said separator a passageway for flowing the vapor-liquid mixture from said chamber to said separator, and a conduit having its inlet located above said separator and extending downwardly to said first bundle for flowing vapor through the inside of said tubular fuel elements.

8. A fuel element assembly for use in a boiling coolant nuclear reactor adapted to superheat vapor generated therein comprising a lower tube sheet, an upper tube sheet spaced above and in axial alignment with said lower tube sheet, plate means in combination with said lower tube sheet forming an outlet chamber, plate means in combination with said upper tube sheet forming an inlet chamber, a bundle of spaced vertically extending tubular fuel elements fitted into and extending between said tube sheets and communicating between said inlet and outlet chambers, a pair of horizontally disposed vertically spaced end plates axially aligned above said bundle of tublar fuel elements, a bundle of spaced vertically elongated pin-type fuel components extending between and having their ends secured within said end plates, the lower of said end plates having a number of openings therethrough, a cylindrically shaped vertically disposed cyclone type vapor-liquid separator axially aligned above said bundle of pin type fuel components, vertically extending wall means disposed about and spaced from both of said bundles and vapor-liquid separator to form a riser chamber about said bundles and in combination with said separator a passageway connecting said riser chamber and said separator, means providing a closure for the top of said passageway, the bottom edge of said wall means spaced above said lower tube sheet and forming therebetween a coolant inlet to said riser chamber, and a conduit extending downwardly centrally through said assembly and having its inlet located above said separator and its outlet opening to said inlet chamber for flowing vapor through the inside of tubular fuel elements.

9. A boiling coolant nuclear reactor having a vertically elongated pressure vessel containing a coolant inlet and a vaporized coolant outlet, a normal coolant liquid level dividing said pressure vessel into a body of coolant disposed below a vapor space, a support plate transversely arranged within said body of coolant and having a number of openings therethrough, a plurality of vertically disposed fuel element assemblies having the lower ends thereof secured within the openings in said support plate and the upper ends thereof located in said vapor space, said assemblies containing material fissionable by neutrons of thermal energy and arranged in a regular lattice to form a core, control means positioned within said pressure vessel to provide a controlled fission reaction within said assemblies, each of said fuel element assemblies comprising a bundle of tubular fuel elements, a cyclone type vapor-liquid separator axially aligned with and superjacent to said bundle, said separator having a separated vapor outlet located in said vapor space, vertically extending wall means disposed laterally about and spaced from said tubular fuel elements and vapor-liquid separator to form a riser chamber about said bundle of fuel elements and in combination with said separator a passageway for connecting said chamber to said separator, the lower end of said wall means spaced above said support plate to form a coolant inlet opening to said riser chamber, a plate section closing the upper end of said passageway, a conduit having its inlet end located in said vapor space above said separator and extending centrally downward through the fuel element assembly to said bundle of tubular fuel elements to flow vapor from said vapor space to the inside of said tubular fuel elements for its passage therethrough, deflector means located closely above and opposite said separated vapor outlet, a scrubber located in said vapor space and positioned in a horizontal plane disposed between said separated vapor outlet and the inlet to said conduit, thermal shielding means disposed both laterally about and below said core, a wall section positioned below and connected to said support plate and forming in combination therewith a vapor collection chamber, and a horizontally disposed ring shaped coolant inlet header located in said body of coolant in communication with said coolant inlet.

References Cited by the Examiner
UNITED STATES PATENTS

| | | | |
|---|---|---|---|
| 1,784,627 | 12/30 | Hamill. | |
| 2,648,397 | 8/53 | Ravese et al. | |
| 2,938,845 | 5/60 | Treshow | 176—54 |
| 2,982,712 | 5/61 | Heckman | 176—20 |
| 2,987,458 | 6/61 | Breden et al. | 176—73 |
| 2,999,059 | 9/61 | Treshow | 176—42 |
| 3,009,869 | 11/61 | Bassett | 176—68 |
| 3,010,889 | 11/61 | Fortescue et al. | 176—19 |
| 3,015,616 | 1/62 | Sturtz et al. | 176—78 |
| 3,070,537 | 12/62 | Treshow | 176—78 |

FOREIGN PATENTS

| | | |
|---|---|---|
| 553,050 | 12/56 | Belgium. |
| 556,289 | 4/57 | Belgium. |
| 1,198,728 | 6/59 | France. |
| 875,329 | 8/61 | Great Britain. |

CARL D. QUARFORTH, *Primary Examiner.*
REUBEN EPSTEIN, *Examiner.*